(12) United States Patent
Araki et al.

(10) Patent No.: US 8,736,143 B2
(45) Date of Patent: May 27, 2014

(54) VIBRATION WAVE DRIVING APPARATUS

(75) Inventors: Yasuyuki Araki, Kawasaki (JP);
Takayuki Tsukimoto, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 105 days.

(21) Appl. No.: 13/428,179

(22) Filed: Mar. 23, 2012

(65) Prior Publication Data
US 2012/0274181 A1 Nov. 1, 2012

(30) Foreign Application Priority Data

Apr. 26, 2011 (JP) .................................. 2011-098681

(51) Int. Cl.
*H02N 2/00* (2006.01)

(52) U.S. Cl.
USPC ............ 310/323.13; 310/323.02; 310/323.16; 310/323.17; 310/328

(58) Field of Classification Search
USPC ............. 310/323.01–323.04, 323.08, 323.09, 310/323.13, 323.15–323.17, 328
See application file for complete search history.

(56) References Cited

U.S. PATENT DOCUMENTS

| | | | |
|---|---|---|---|
| 4,692,650 A * | 9/1987 | Okumura et al. | 310/323.08 |
| 4,752,711 A | 6/1988 | Tsukimoto et al. | |
| 5,028,833 A * | 7/1991 | Kawai | 310/323.08 |
| 5,233,257 A * | 8/1993 | Luthier et al. | 310/323.08 |
| 5,274,295 A | 12/1993 | Tsukimoto et al. | |
| 5,347,192 A | 9/1994 | Mukohjima et al. | |
| 5,359,251 A * | 10/1994 | Tsukimoto et al. | 310/323.13 |
| 5,585,685 A * | 12/1996 | Maeno et al. | 310/323.02 |
| 5,646,469 A * | 7/1997 | Tsukimoto et al. | 310/323.01 |
| 5,917,270 A | 6/1999 | Tsukimoto et al. | |
| 5,945,771 A * | 8/1999 | Kimura et al. | 310/323.05 |
| 2011/0227454 A1 | 9/2011 | Araki et al. | |

FOREIGN PATENT DOCUMENTS

| | | |
|---|---|---|
| JP | 61-224882 A | 10/1986 |
| JP | 2004-304887 A | 10/2004 |

* cited by examiner

*Primary Examiner* — Thomas Dougherty
(74) *Attorney, Agent, or Firm* — Fitzpatrick, Cella, Harper & Scinto

(57) ABSTRACT

A vibration wave driving apparatus can match the vibration direction of a projecting portion of a vibrator to the displacement direction of a contacting portion of a driven body so that the projecting portion of the vibrator and the contacting portion of the driven body can be brought into contact and driven with stability. The vibration direction of the projecting portion is affected by selecting the position of the projecting portion relative to the nodes of vibration.

14 Claims, 9 Drawing Sheets

FIG. 1A
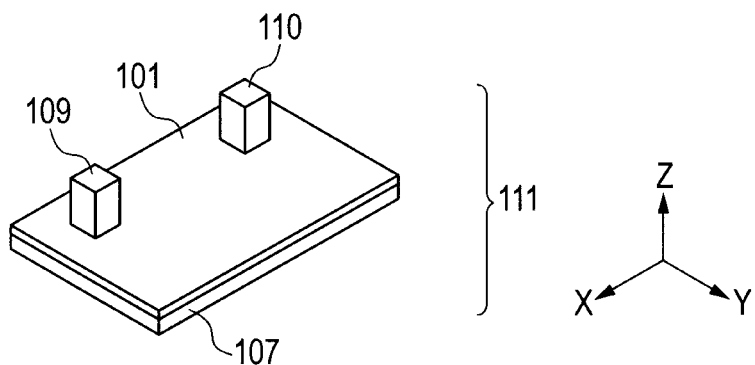
FIG. 1B
MODE-A
FIG. 1C
MODE-B
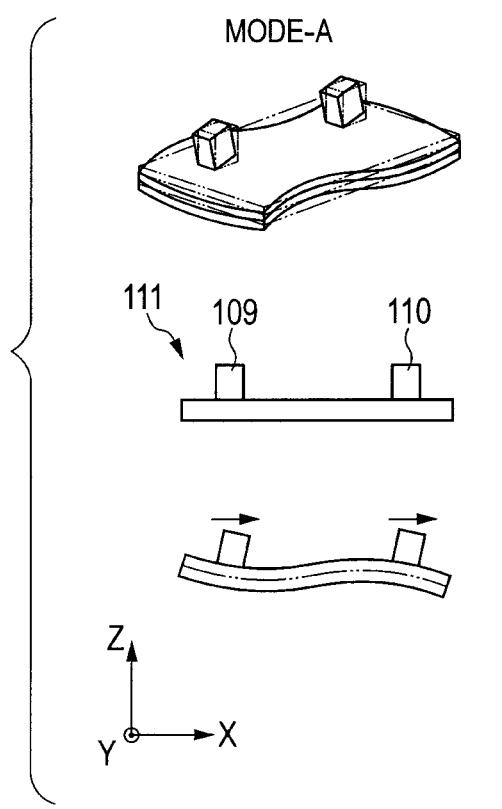
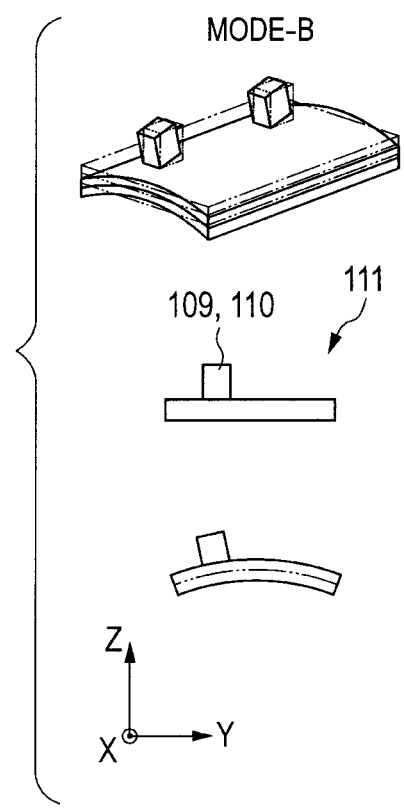

MODE-A

MODE-B

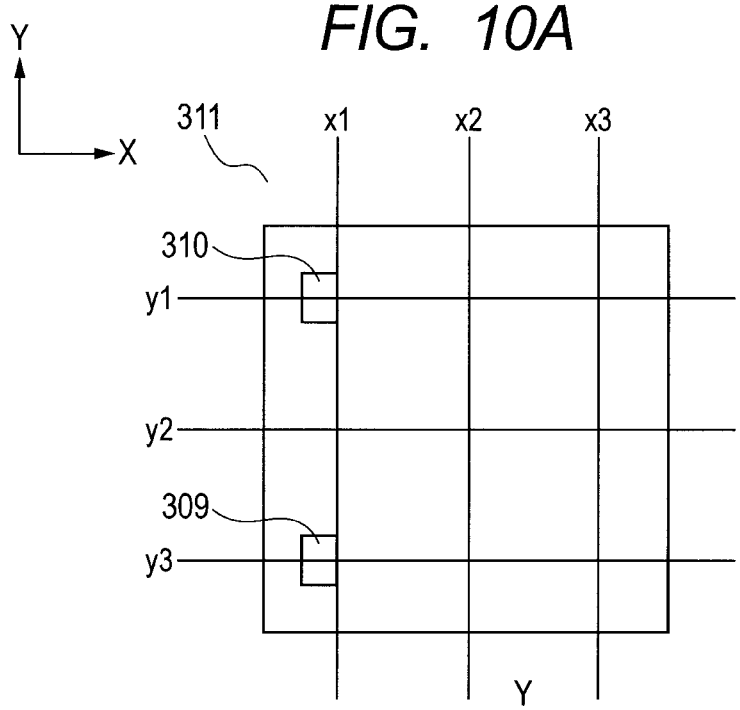
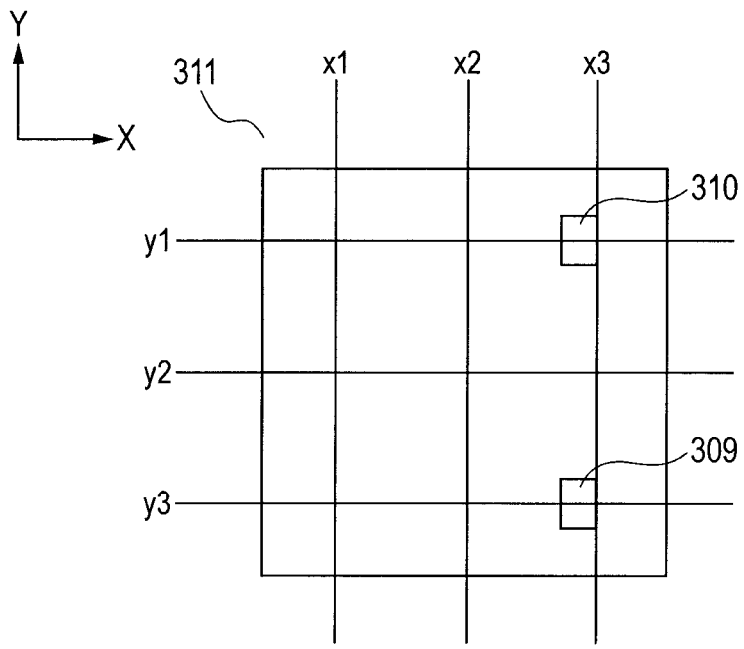

VIBRATION WAVE DRIVING APPARATUS

BACKGROUND OF THE INVENTION

1. Field of the Invention

The present invention relates to a vibration wave driving apparatus that causes a vibration body to generate a vibration wave by applying an alternating voltage to an electro-mechanical energy conversion element to drive a moving body by the vibration wave.

2. Description of the Related Art

A vibration wave driving apparatus as described in Japanese Patent Application Laid-Open No. 2004-304887 is proposed in the past as a linear ultrasonic motor that linearly drives a driven body.

The driving principle of such a linear ultrasonic motor will be described by using FIGS. 4A to 4C. As shown in an outside perspective view of a linear ultrasonic motor in FIG. 4A, a linear ultrasonic motor 410 includes a vibrator 401, a slider 406, and a pressing member (not shown) to press the vibrator 401 against the slider 406.

The vibrator 401 includes an electro-mechanical energy conversion element 405 such as a piezoelectric element and an elastic body 402 joined to one side of the electro-mechanical energy conversion element 405 for integration and formed in a rectangular shape.

Further, the vibrator 401 includes two projecting portions 403, 404 formed in a convex shape on the upper surface of the elastic body 402.

In the ultrasonic motor, the vibration for driving is generated by exciting a plurality of desired vibration modes by applying the voltage of a specific frequency to the piezoelectric element and superposing these vibration modes.

In the motor in FIG. 4A, the vibrator 401 is caused to excite two bending vibration modes shown in FIGS. 4B and 4C.

Both of these two bending vibration modes are bending vibration modes in an out-of-plane direction of the plate-shaped vibrator 401.

One vibration mode is a secondary bending vibration mode (Mode-A) in the longitudinal direction of the vibrator 401 and the other vibration mode is a primary bending vibration mode (Mode-B) in the transverse direction of the vibrator 401.

The shape of the vibrator 401 is designed in such a way that the resonant frequencies of the two vibration modes match or are close to each other.

The projecting portions 403, 404 are arranged close to positions as nodes of vibration in the Mode-A vibration and apical surfaces 403-1, 404-1 of the projecting portions make a pendulum motion due to the Mode-A vibration with nodes of vibration acting as a fulcrum and thus make a reciprocating motion in the X direction. That is, the apical surfaces 403-1, 404-1 of the projecting portions make a reciprocating motion in a direction along which the slider serving as the driven body moves relatively due to the Mode-A vibration.

The projecting portions 403, 404 are also arranged close to positions as loops of vibration in the Mode-B vibration and the apical surfaces 403-1, 404-1 of the projecting portions make a reciprocating motion in the Z direction due to the Mode-B vibration. That is, the apical surfaces 403-1, 404-1 of the projecting portions make a reciprocating motion in a direction along which the slider serving as the driven body is knocked up (corresponding to the direction perpendicular to the apical surface of the projecting portion) due to the Mode-B vibration.

The apical surfaces 403-1, 404-1 of the projecting portions make an elliptical motion in an XZ plane by simultaneously exciting and superposing these two vibration modes (Mode-A and Mode-B) in such a way that a vibration phase difference is close to $\pm\pi/2$.

The pressure-contacted slider 406 can be driven in one direction by the elliptical motion.

On the other hand, a vibration wave driving apparatus as described in Japanese Patent Application Laid-Open No. S61-224882 is proposed in the past as a rotary ultrasonic motor that rotates a driven body.

This kind of vibration wave driving apparatus is shown in FIG. 5A.

In FIG. 5A, an elastic body 502 has an annular shape and a plurality of projections 502b is provided in an upper part thereof all around the elastic body 502. A moving body 503 is in pressure-contact with the elastic body 502 by a pressing member (not shown).

The moving body 503 includes a ring-shaped body portion 503a formed of an elastic member, a flange portion 503b extending from the body portion 503a, and a contacting portion 503c extending from an end of the flange portion 503b and having a frictional surface that is frictionally in contact with the elastic body 502.

A piezoelectric element 501 is bonded to the bottom of the elastic body 502 by an adhesive and generates a traveling vibration wave by an alternating voltage having a phase difference being applied by a driving circuit (not shown) when a motor is driven. If the traveling direction of the traveling vibration wave is a direction in which the θ direction is positive (see an arrow in FIG. 5A), the direction of movement of the moving body 503 driven by friction is a direction in which the θ direction is negative.

A motor that rotates the moving body 503 described in Japanese Patent Application Laid-Open No. S61-224882 can be produced by arranging, instead of the elastic body 502 and the piezoelectric element 501 described in Japanese Patent Application Laid-Open No. S61-224882, a plurality of the vibrators 401 described in Japanese Patent Application Laid-Open No. 2004-304887 in such a way that the longitudinal direction of the vibrator 401 matches the rotational direction of the moving body.

FIG. 5B shows a case when, for example, the three vibrators 401 are arranged. If the apical surfaces 403-1, 404-1 of the projecting portions of the vibrator 401 and the contacting portion 503c of the moving body 503 are brought into pressure-contact and the vibrator 401 is caused to excite two bending vibration modes, the moving body 503 rotates.

SUMMARY OF THE INVENTION

However, the vibration wave driving apparatus configured as shown in FIG. 5B has a problem described below.

The moving body 503 described in Japanese Patent Application Laid-Open No. S61-224882 has a cantilever structure having spring properties and when the contacting portion 503c of the moving body 503 is displaced, as shown in FIG. 5C, the contacting portion 503c is displaced not only in the Z direction, but also in the radial direction.

On the other hand, the vibration direction of each of the apical surfaces 403-1, 404-1 of the projecting portions of the vibrator 401 in the primary bending vibration mode in the transverse direction of the vibrator 401 is, as shown in FIG. 4C, only the Z direction displacement.

Thus, the displacement direction of the contacting portion 503c of the moving body 503 and the direction of vibration trajectory of the apical surfaces 403-1, 404-1 of the projecting portions do not match and sliding in the radial direction arises, leading to unstable contact and lower driving efficiency.

In view of the above problem, an object of the present invention is to provide a vibration wave driving apparatus capable of matching the vibration direction of a projecting portion of a vibrator to the displacement direction of a contacting portion of a driven body so that the projecting portion of the vibrator and the contacting portion of the driven body can be brought into contact and driven with stability.

A vibration wave driving apparatus according to the present invention is a vibration wave driving apparatus including: a vibrator having an electro-mechanical energy conversion element and an elastic body having a projecting portion formed thereon; and a driven body having a contacting portion coming into contact with the projecting portion of the vibrator, wherein the apparatus causes the driven body coming into contact with the projecting portion to relatively move by applying an alternating voltage to the electro-mechanical energy conversion element to excite an elliptical motion by two bending modes of a first bending mode and a second bending mode whose nodal lines are substantially orthogonal to each other in the projecting portion of the vibrator, and the driven body is configured by an annular moving body, the contacting portion has spring properties, and the projecting portion is provided in a position between the position to be a loop of vibration of the first bending mode and the position to be a node of the vibration and in a vicinity of the position to be the node of the second bending mode, and a vibration direction of the projecting portion of the vibrator becomes a direction corresponding to a displacement direction of the contacting portion of the driven body.

According to the present invention, a vibration wave driving apparatus capable of matching the vibration direction of a projecting portion of a vibrator to the displacement direction of a contacting portion of a driven body so that the projecting portion of the vibrator and the contacting portion of the driven body can be brought into contact and driven with stability can be provided.

Further features of the present invention will become apparent from the following description of exemplary embodiments with reference to the attached drawings.

BRIEF DESCRIPTION OF THE DRAWINGS

FIG. 1A is an outside perspective view of a vibrator according to a first embodiment of the present invention.

FIG. 1B is a diagram showing a vibration mode excited in the vibrator according to the first embodiment of the present invention.

FIG. 1C is a diagram showing a vibration mode excited in the vibrator according to the first embodiment of the present invention.

FIG. 10A is a diagram viewed just above the vibrator according to the second embodiment of the present invention.

FIG. 10B is a diagram viewed just above the vibrator according to the second embodiment of the present invention.

DESCRIPTION OF THE EMBODIMENTS

Preferred embodiments of the present invention will now be described in detail in accordance with the accompanying drawings.

First Embodiment

As the first embodiment, a configuration example of the vibrator in a vibration wave driving apparatus such as an ultrasonic motor to which the present invention is applied, is described.

A vibration wave driving apparatus according to the present embodiment includes: a vibrator having an electro-mechanical energy conversion element and an elastic body having a projecting portion formed thereon; and a driven body having a contacting portion coming into contact with the projecting portion of the vibrator.

Figure 4A:
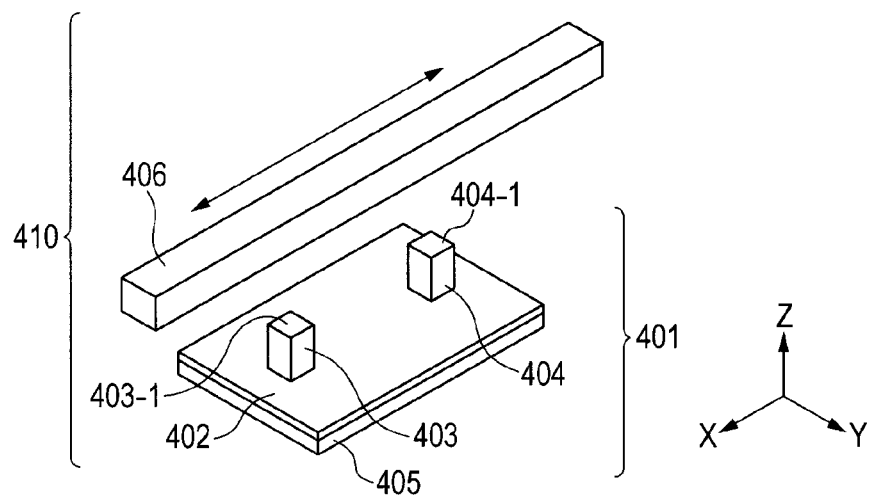
FIG. 4A is an outside perspective view of a linear ultrasonic motor described in Japanese Patent Application Laid-Open No. 2004-304887.
Figure 4B:
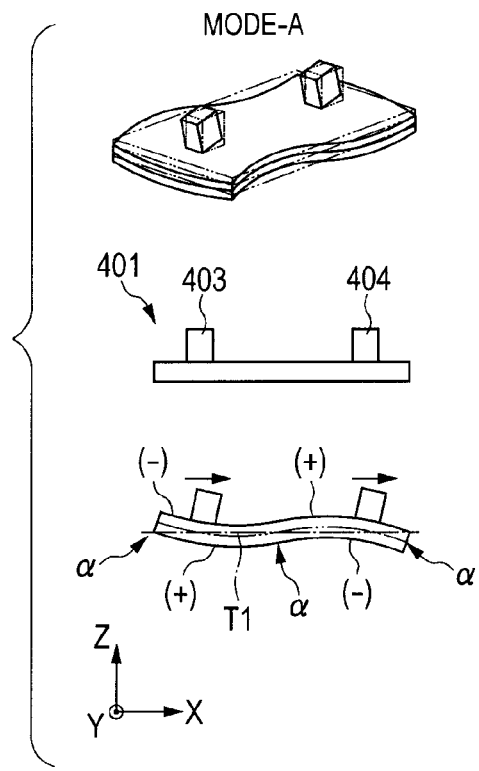
FIG. 4B is a diagram showing the vibration mode excited in the vibrator of the linear ultrasonic motor described in Japanese Patent Application Laid-Open No. 2004-304887.
Figure 4C:
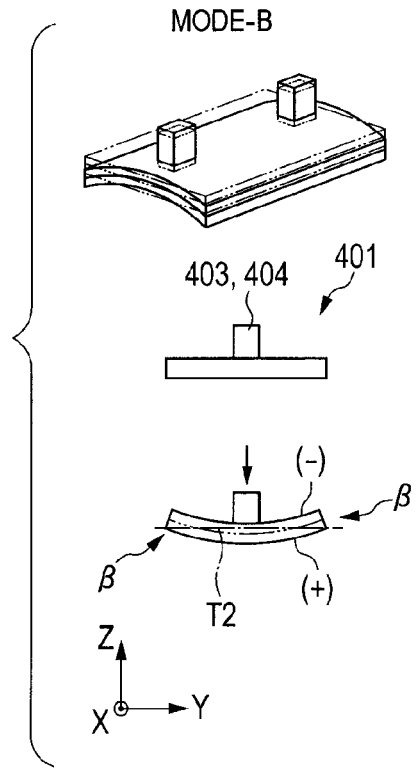
FIG. 4C is a diagram showing the vibration mode excited in the vibrator of the linear ultrasonic motor described in Japanese Patent Application Laid-Open No. 2004-304887.

Then, an elliptical motion by two bending modes of a first bending mode and a second bending mode whose nodal lines are substantially orthogonal to each other is excited in the projecting portion of the vibrator by application to the electro-mechanical energy conversion element. The vibration excited in the vibrator of the present invention is the same as that in the conventional example described in FIGS. 4A to 4C, and the first and second bending modes of the present invention correspond to Mode-A and Mode-B vibrations, respectively.

Accordingly, the driven body in contact with the projecting portion is relatively moved.

FIGS. 1A to 1C are diagrams showing the configuration of a vibrator of a vibration wave driving apparatus according to the present embodiment.

In FIGS. 1A to 1C, reference numeral 111 denotes a vibrator. The vibrator 111 in the present embodiment includes an elastic body 101 in a rectangular shape, a piezoelectric element 107, and two projecting portions 109, 110 provided on the elastic body.

The projecting portions 109, 110 are provided in the vicinity of positions to be nodes of vibration of the secondary bending vibration mode in the longitudinal direction of the two bending modes. In the present invention, "vicinity of positions to be nodes" includes not only exactly "positions to be nodes", but also "positions shifted from positions to be nodes" within a certain tolerance. For example, though shifted from positions to be nodes in a strict sense due to an error during the manufacture or the like, positions that enable substantially equivalent functions as provided in positions to be nodes become "vicinity of positions to be nodes". That is, positions capable of generating the vibration as designed become "vicinity of positions to be nodes".

The projecting portions 109, 110 are also provided between positions to be loops of vibration and positions to be nodes of vibration in the primary bending vibration mode in the transverse direction of the two bending modes.

Figure 7:
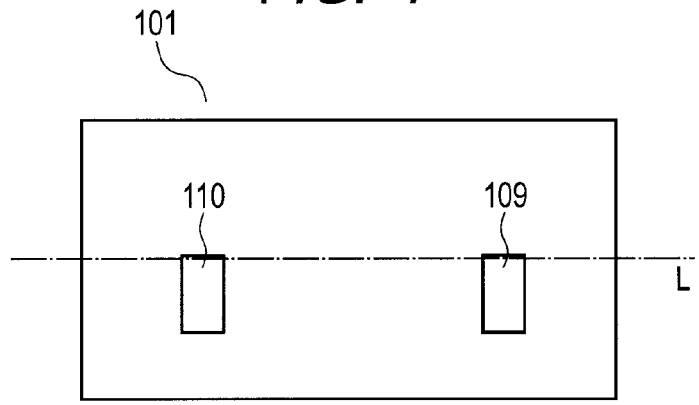
FIG. 7 is a diagram viewed just above in the vertical direction of the vibrator according to the first embodiment of the present invention.

In the present embodiment, as shown in FIG. 7, the two projecting portions 109, 110 are provided on the upper surface of the elastic body 101 by separating by the same amount in the transverse direction of the elastic body 101 from a center axis L in the longitudinal direction of the elastic body 101.

Figure 2:
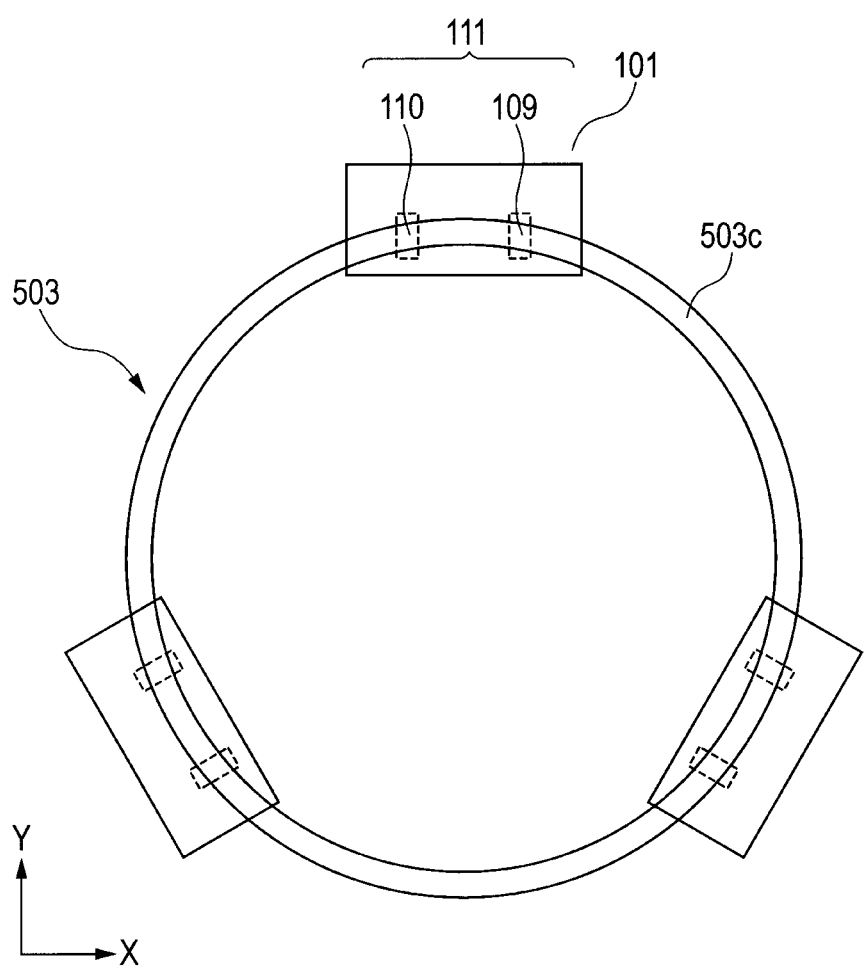
FIG. 2 is a diagram of a positional relationship between the vibrator according to the first embodiment of the present invention and a contacting portion of a moving body when viewed from a vertical direction.

FIG. 2 is a diagram of the positional relationship between the vibrator 111 and the moving body 503 as a driven body when viewed from just above.

Figure 5A:
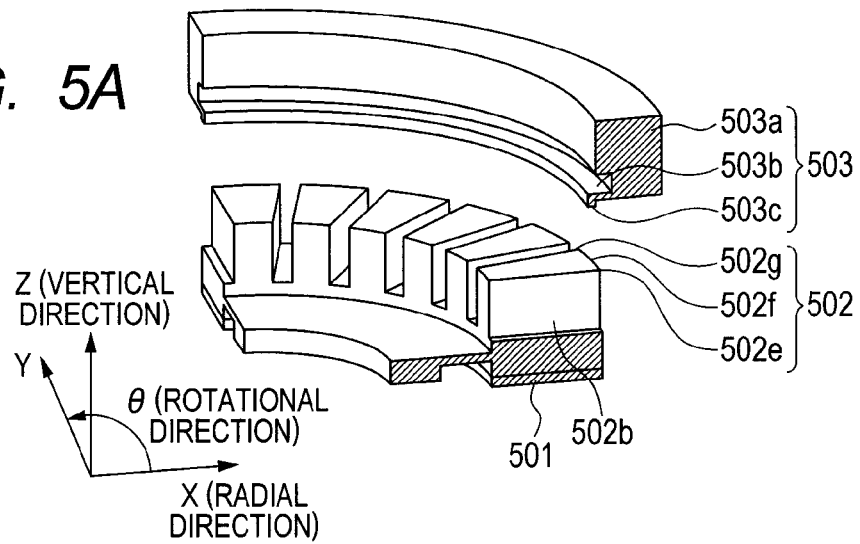
FIG. 5A is a perspective view of a rotary ultrasonic motor according to a conventional example.
Figure 5B:
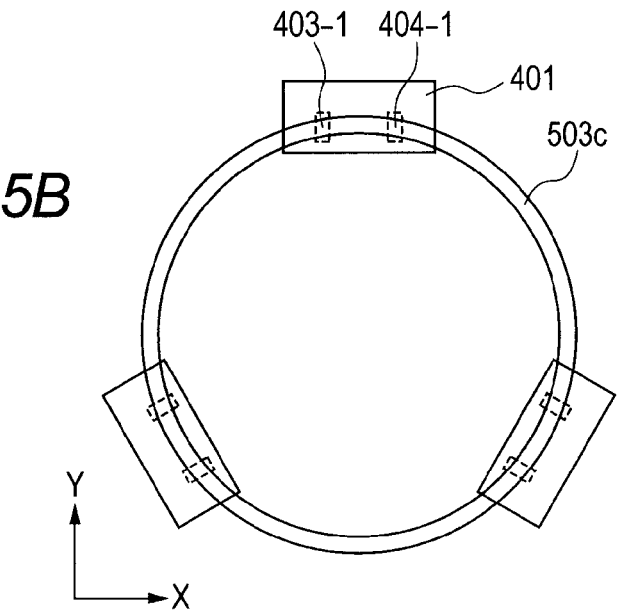
FIG. 5B is a diagram viewed just above in the vertical direction of the rotary ultrasonic motor configured by using a linear vibrator according to a conventional example.

The moving body 503 in the present embodiment has basically the same configuration as the configuration shown in the conventional technology in FIG. 5A.

The moving body in the present embodiment is configured by an annular moving body and has a cantilever structure in which the contacting portion has spring properties.

More specifically, the moving body 503 includes the ring-shaped body portion 503a formed of an elastic member, the flange portion 503b extending from the body portion 503a, and the contacting portion 503c extending from an end of the flange portion 503b and having a frictional surface that is frictionally in contact with the elastic body 502. The contacting portion 503c is provided on an inner side in the radial direction from the body portion 503a.

As shown in FIG. 2, a plurality of the vibrators 111 is arranged in such a way that the longitudinal direction of the vibrator 111 matches the rotational direction of the moving body 503.

At this point, the two projecting portions 109, 110 are both on the inner side in the radial direction with respect to loops of vibration in the primary bending vibration mode in the transverse direction.

The projecting portions 109, 110 of the vibrator 111 and the contacting portion 503c of the moving body are brought into pressure-contact.

If an alternating voltage is applied to the piezoelectric element 107 from a power supply (not shown), the two bending vibration modes are excited in the vibrator 111 and an elliptical motion is excited for the contact surfaces of the projecting portions 109, 110.

As a result, the moving body in pressure-contact with the projecting portions 109, 110 receives a friction driving force and is driven in the longitudinal direction of the vibrator 101 to rotate around the center of the ring as an axis.

Figure 5C:
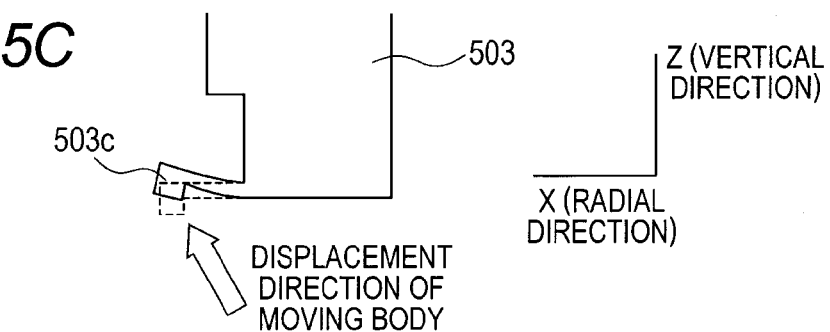
FIG. 5C is a diagram showing the displacement direction of the contacting portion of the moving body in FIG. 5B.

The projecting portions 109, 110 are provided in positions matching the displacement (angle) of the contacting portion of the rotor shown in FIG. 5C.

Figure 8A:
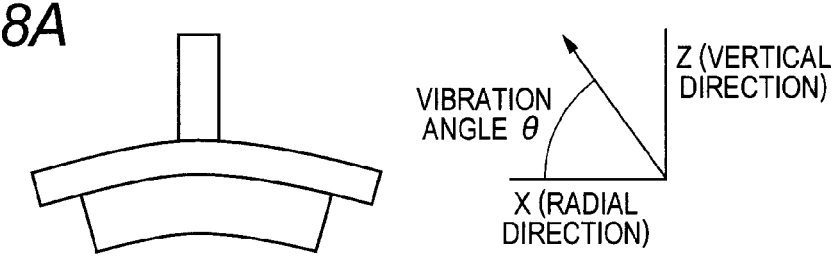
FIG. 8A is a diagram showing changes of a vibration angle of a projecting portion in the primary bending vibration mode in a transverse direction of the vibrator due to differences of arrangement of the projecting portion.
Figure 8B:
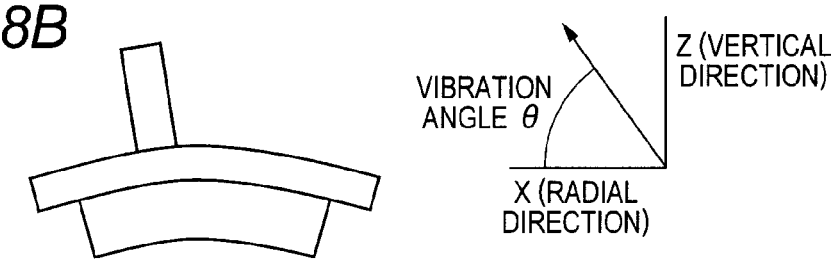
FIG. 8B is a diagram showing changes of the vibration angle of the projecting portion in the primary bending vibration mode in the transverse direction of the vibrator due to differences of arrangement of the projecting portion.
Figure 8C:
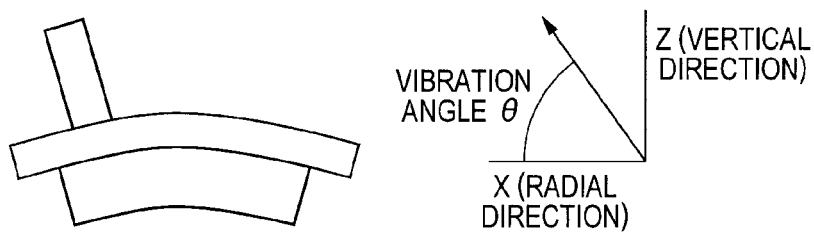
FIG. 8C is a diagram showing changes of the vibration angle of the projecting portion in the primary bending vibration mode in the transverse direction of the vibrator due to differences of arrangement of the projecting portion.

FIGS. 8A to 8C show the relationship between the position of the projecting portion and the displacement of the projecting portion.

FIG. 8A shows a case when the projecting portion is provided in a position to be a loop of vibration in the primary bending vibration mode in the transverse direction of the vibrator. FIG. 8B shows a case when the projecting portion is shifted from the position to be a loop of the vibration. FIG. 8C shows a case when the projecting portion is more shifted from the position to be a loop of the vibration than in FIG. 8B. As shown in FIGS. 8A to 8C, the displacement in the radial direction increases with an increasing distance of the position of the projection from the position of a loop of the vibration.

Figure 9:
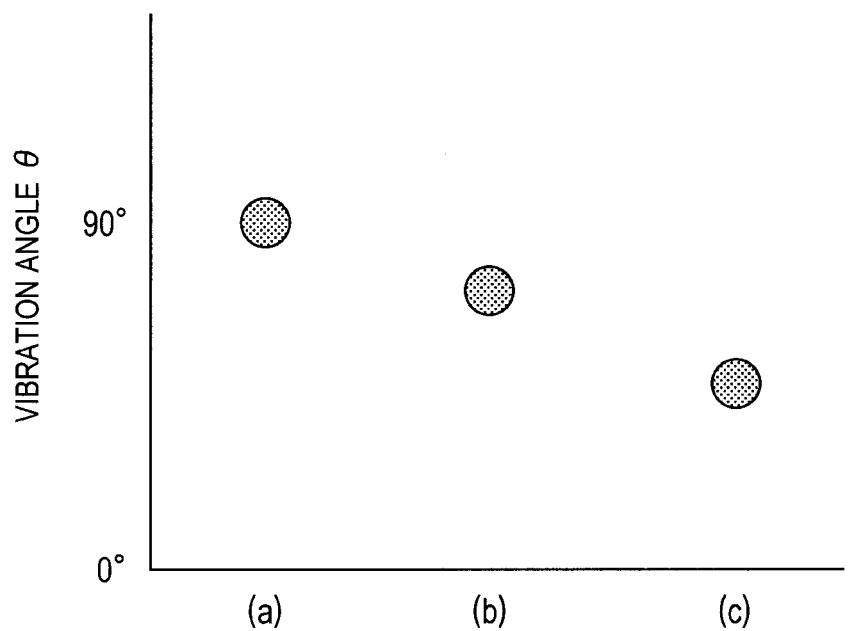
FIG. 9 is a diagram showing changes of the vibration angle of the projecting portion in the primary bending vibration mode in the transverse direction of the vibrator due to differences of arrangement of the projecting portion.

Therefore, if the vibration angle between the displacement of the projecting portion in the Z (vertical) direction and the displacement in the X (radial) direction is 90° when displaced only in the Z direction, as shown in FIG. 9, the vibration angle of the projecting portion decreases with an increasing distance from the position of a loop of the vibration.

By using the principle described above, the present embodiment is configured so that the vibration direction of the projecting portion becomes the vibration direction corresponding to the displacement direction of the contacting portion by arranging the projecting portions 109, 110 in the above positions on the elastic body 101.

Figure 3:
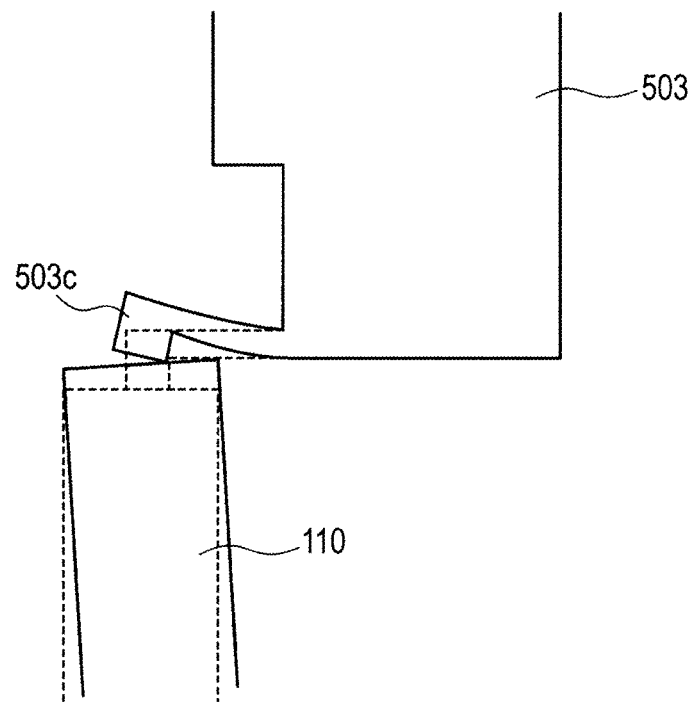
FIG. 3 is a diagram showing a displacement direction of the projection of the vibrator and the contacting portion of the moving body.

Accordingly, the vibration direction of the projecting portion 110 of the elastic body 101 of a vibrator in the primary bending vibration mode can substantially be matched to the displacement direction of the contact surface of the moving body 503 and, as shown in FIG. 3, sliding in the radial direction is reduced and driving with stable contact can be caused.

Second Embodiment

As the second embodiment, a configuration example of the vibrator in a vibration wave driving apparatus in a form different from the first embodiment will be described by using FIGS. 1A to 1C.

While the first embodiment uses the primary bending mode in the transverse direction to match the displacement direction of the contact surface of the moving body, the second embodiment of the present invention uses the secondary bending mode or higher order bending modes.

As for the other points (the piezoelectric element, moving body, how to combine a vibrator and a moving body, and the principle of driving by exciting two bending modes), the present embodiment is the same as the first embodiment described above and the description thereof is omitted.

FIGS. 10A and 10B show diagrams of a vibrator 311 of a vibration wave driving apparatus according to the second embodiment of the present invention viewed from above.

In the present embodiment, the secondary bending mode in the X direction and the secondary bending mode in the Y direction are used for driving. If the secondary bending mode is excited in the X direction, nodal lines x1, x2, x3 are generated. If the secondary bending mode is excited in the Y direction, nodal lines y1, y2, y3 are also generated.

Like the first embodiment, projecting portions 309, 310 are provided so that the displacement direction of the contact surface of a moving body substantially matches the vibration direction of the projecting portion 310 of the vibrator 311 in the secondary bending vibration mode in the X direction.

Figure 6A:
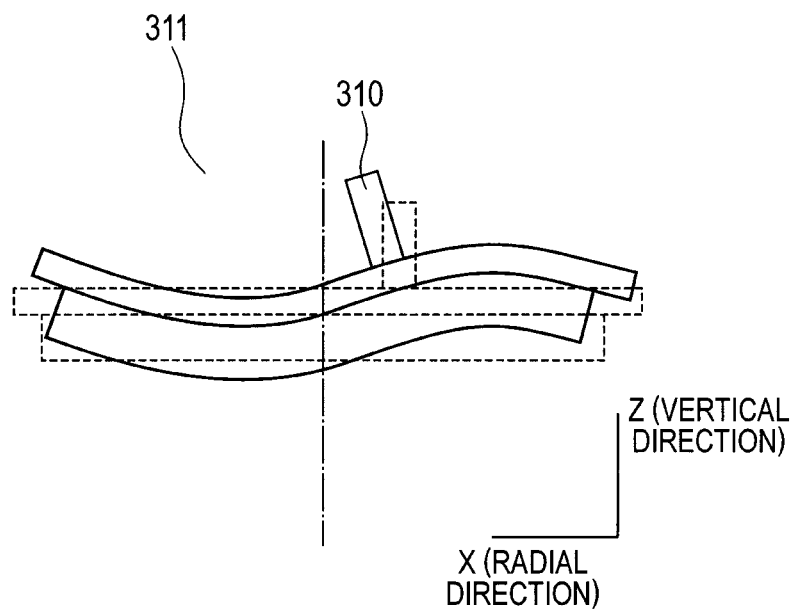
FIG. 6A is a diagram showing a secondary bending mode in the X direction of the vibrator according to a second embodiment of the present invention.
Figure 6B:
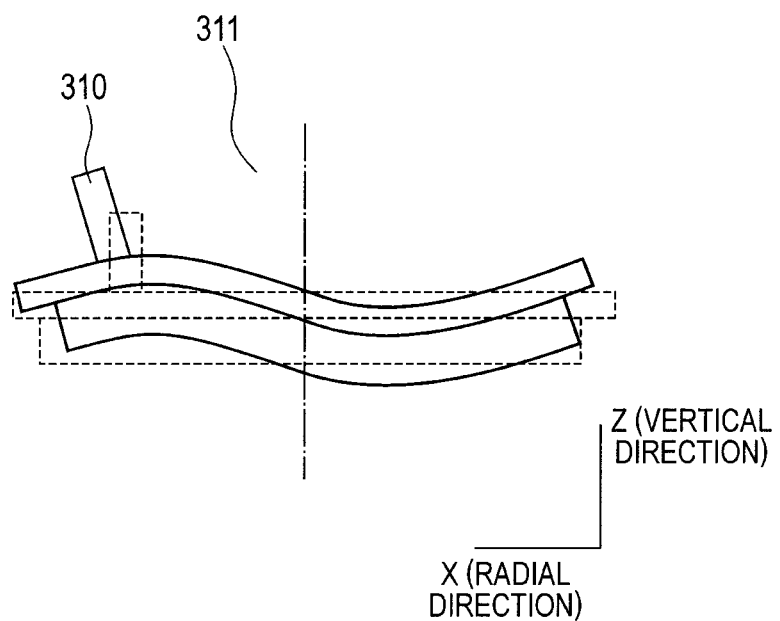
FIG. 6B is a diagram showing the secondary bending mode in the X direction of the vibrator according to the second embodiment of the present invention.

FIGS. 6A and 6B are diagrams showing the secondary bending mode in the X direction of the vibrator 311 of a vibration wave driving apparatus according to the second embodiment of the present invention.

A case when the projecting portion 310 is provided between positions of two loops of vibration and on the outer side in the radial direction with respect to the center line is shown in FIG. 6A. A case when the projecting portion 310 is provided on the outer side of both outer sides of positions of two loops of vibration closer to an axial direction of the rotor is shown in FIG. 6B.

Where to provide the projecting portion is decided by considering the position of the contacting portion of the rotor and the space in which the vibrator can be arranged.

By adopting the configuration as described above, sliding in the radial direction can be reduced.

According to the configuration of each embodiment of the present invention, as described above, the position of a projecting portion of an elastic body can be shifted from the position of a loop of vibration in the primary bending vibration mode in the transverse direction by matching to the displacement direction of the contact surface of a moving body.

Accordingly, the vibration direction of the projecting portion and the displacement direction of the contact surface of the moving body can be made the same direction so that a vibration wave driving apparatus capable of driving with stable contact can be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-098681, filed Apr. 26, 2011, which is hereby incorporated by reference herein in its entirety.

What is claimed is:

1. A vibration wave driving apparatus, comprising:
a vibrator having an electro-mechanical energy conversion element and an elastic body having a projecting portion; and
a driven body having a contacting portion coming into contact with the projecting portion of the vibrator,
wherein the apparatus causes the driven body, when coming into contact with the projecting portion, to change position relative to the vibrator by two bending modes, a first bending mode and a second bending mode whose nodal lines are substantially orthogonal to each other,
wherein the driven body has an annular shape,
wherein the contacting portion has spring properties,
wherein the elastic body has an end portion in a driving direction,
wherein the projecting portion is provided at a position between a position of an antinode and a position of a node of the vibration of the first bending mode,
wherein the position at which the projecting portion is provided is in a vicinity of a position of a node of the second bending mode, and
wherein a vibration direction of the projecting portion of the vibrator corresponds to a displacement direction of the contacting portion of the driven body.

2. The vibration wave driving apparatus according to claim 1, wherein the projecting portion of the vibrator is arranged on the elastic body so that the vibration direction of the projecting portion of the vibrator substantially matches the displacement direction of the contacting portion of the driven body.

3. The vibration wave driving apparatus according to claim 1, wherein the relative position of the driven body and the vibrator is changed by applying an alternating voltage to the electro-mechanical energy conversion element.

4. The vibration wave driving apparatus according to claim 3, wherein an elliptical motion is excited in the projecting portion of the vibrator by applying the alternating voltage.

5. A vibration wave driving apparatus, comprising:
a vibrator having an electro-mechanical energy conversion element and an elastic body having a projecting portion; and
a driven body having a contacting portion coming into contact with the projecting portion of the vibrator,
wherein the vibrator is configured such that two bending modes, a first bending mode and a second bending mode whose nodal lines are substantially orthogonal to each other, are excited,
wherein the driven body has an annular shape,
wherein the contacting portion has spring properties,
wherein the elastic body has an end portion in a driving direction,
wherein the projecting portion is provided at a position between a position of an antinode and a position of a node of vibration of the first bending mode, and
wherein the position at which the projecting portion is provided is in a vicinity of a position of a node of the second bending mode.

6. The vibration wave driving apparatus according to claim 5, wherein the projecting portion of the vibrator is arranged on the elastic body so that a vibration direction of the projecting portion of the vibrator substantially matches a displacement direction of the contacting portion of the driven body.

7. The vibration wave driving apparatus according to claim 5, wherein the relative position of the driven body and the vibrator is changed by applying an alternating voltage to the electro-mechanical energy conversion element.

8. The vibration wave driving apparatus according to claim 7, wherein an elliptical motion is excited in the projecting portion of the vibrator by applying the alternating voltage.

9. A vibration wave driving apparatus, comprising:
a vibrator having an electro-mechanical energy conversion element and an elastic body having at least two projecting portions; and
a driven body having at least two contacting portions which come into contact with the at least two projecting portions of the vibrator,
wherein the vibrator is configured such that two bending modes, a first bending mode and a second bending mode whose nodal lines are substantially orthogonal to each other, are excited,
wherein the driven body has an annular shape,
wherein the at least two contacting portions have spring properties,
wherein the elastic body has an end portion in a driving direction, and
wherein the at least two projecting portions are asymmetrically-arranged with respect to a center line of the elastic body, the center line being along a driving direction of the vibrator.

10. The vibration wave driving apparatus according to claim 9, wherein the at least two projecting portions are arranged at one side of the elastic body with respect to the center line.

11. The vibration wave driving apparatus according to claim 9, wherein a vibration direction of one of the at least two projecting portions of the vibrator becomes a direction corresponding to a displacement direction of one of the at least two contacting portions of the driven body, the one of the at least two contacting portions being configured to come into contact with the one of the at least two projecting portions.

12. The vibration wave driving apparatus according to claim 9, wherein the projecting portions of the vibrator are arranged on the elastic body so that a vibration direction of the projecting portions of the vibrator substantially matches a displacement direction of the contacting portions of the driven body.

13. The vibration wave driving apparatus according to claim 9, wherein the relative position of the driven body and the vibrator is changed by applying an alternating voltage to the electro-mechanical energy conversion element.

14. The vibration wave driving apparatus according to claim 13, wherein an elliptical motion is excited in the projecting portions of the vibrator by applying the alternating voltage.

* * * * *